(12) United States Patent
Elferich et al.

(10) Patent No.: US 9,544,962 B2
(45) Date of Patent: Jan. 10, 2017

(54) DRIVER DEVICE AND DRIVING METHOD FOR DRIVING AN LED UNIT

(75) Inventors: Reinhold Elferich, Aachen (DE); Toni Lopez, Kelmis (BE); Harald Josef Günther Radermacher, Aachen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 215 days.

(21) Appl. No.: 14/235,302

(22) PCT Filed: Jul. 25, 2012

(86) PCT No.: PCT/IB2012/053789
§ 371 (c)(1),
(2), (4) Date: Jan. 27, 2014

(87) PCT Pub. No.: WO2013/017994
PCT Pub. Date: Feb. 7, 2013

(65) Prior Publication Data
US 2014/0159611 A1    Jun. 12, 2014

Related U.S. Application Data

(60) Provisional application No. 61/513,723, filed on Aug. 1, 2011.

(51) Int. Cl.
*H05B 37/00* (2006.01)
*H05B 33/08* (2006.01)
*H02M 3/158* (2006.01)

(52) U.S. Cl.
CPC ...... *H05B 33/0845* (2013.01); *H05B 33/0803* (2013.01); *H05B 33/0815* (2013.01); *H02M 3/158* (2013.01); *Y02B 20/348* (2013.01)

(58) Field of Classification Search
CPC ............ H05B 33/0815; H05B 33/0845; H05B 33/0809; Y02B 20/348; H02M 3/158
(Continued)

(56) References Cited

U.S. PATENT DOCUMENTS 7,102,902 B1    9/2006    Brown et al.
7,852,017 B1   12/2010    Melanson
(Continued)

FOREIGN PATENT DOCUMENTS

AU    2008200904 A1    3/2009
CN    101868078 A     10/2010
(Continued)

OTHER PUBLICATIONS

Henze et al. ,"Zero-Voltage Switching in High Frequency Power Converters Using PWM", IEEE, 1988.*
(Continued)

*Primary Examiner* — Thai Pham
*Assistant Examiner* — Borna Alaeddini

(57) ABSTRACT

The present invention relates to a driver device and a corresponding driving method for driving a load (22), in particular an LED unit, said driver device comprising power input terminals (51, 52) for receiving a periodic supply voltage from an external power supply potentially including a dimmer for dimming said periodic supply voltage, power output terminals (53, 54) for providing a drive voltage and/or drive current for driving a load (22), a power stage (70a, 70b, 70c, 70d) coupled between the power input terminals and the power output terminals for controlling an input current received from said power input terminals to draw a high power from said external power supply in a first mode or to draw a low or no power from said external power supply in a second mode, said high power being higher than the power required for driving said load and said low power being lower than the power required for driving said load, wherein said power stage controls said input current to be in the second mode only for a percentage of half cycle periods of a number of subsequent half cycle periods of said supply voltage, and for providing said drive voltage and/or drive (Continued)

current to said power output terminals in said first mode, and an energy storage unit (90) coupled to said power stage for storing electrical energy provided at said power input terminals in said first mode and for providing stored electrical energy to said load via said power output terminals in said second mode.

7 Claims, 9 Drawing Sheets

(58) Field of Classification Search
USPC .................. 315/291, 93, 200 R, 209 R, 247, 185 R, 315/186, 193
See application file for complete search history.

(56) References Cited

U.S. PATENT DOCUMENTS

| | | | |
|---|---|---|---|
| 8,686,667 B2* | 4/2014 | Mishima | H02M 3/1588 |
| | | | 315/210 |
| 2006/0103363 A1* | 5/2006 | Miftakhutdinov | H02M 3/1588 |
| | | | 323/282 |
| 2009/0160358 A1 | 6/2009 | Leiderman | |
| 2009/0195168 A1 | 8/2009 | Greenfeld | |
| 2009/0315477 A1 | 12/2009 | Kinsella | |
| 2010/0164406 A1 | 7/2010 | Kost et al. | |
| 2011/0085576 A1 | 4/2011 | Crawford et al. | |
| 2011/0121754 A1* | 5/2011 | Shteynberg | H05B 33/0815 |
| | | | 315/294 |
| 2013/0127357 A1* | 5/2013 | Wu | H05B 41/28 |
| | | | 315/200 R |

FOREIGN PATENT DOCUMENTS

| | | | | |
|---|---|---|---|---|
| JP | 2004273267 A | 9/2004 | | |
| JP | 2009053307 A | 3/2009 | | |
| JP | 20102122678 A | 9/2010 | | |
| NL | WO 2010023280 A1 * | 3/2010 | ......... | H05B 33/0815 |
| WO | 2010016002 A1 | 2/2010 | | |
| WO | 2010137002 A1 | 12/2010 | | |
| WO | 2012168847 A1 | 12/2012 | | |

OTHER PUBLICATIONS

Huang-Jen Chiu et al; "A High-Efficiency Dimmable LED Driver for Low-Power Lighting Applications", IEEE Transactions on Industrial Electronics, vol. 57, No. 2, Feb. 2010, pp. 735-743.

Hyun-Lark Do; "Zero-Voltage-Switching Boost Converter Using a Coupled Inductor", Journal of Power Electronics, vol. 11, No. 1, Jan. 2011, pp. 16-20.

Robert Erickson et al; "Design of a Simple High-Power-Factor Rectifier Based on the Flyback Converter", IEEE Proceedings of the Applied Power Electronics Conf. and Expositions, 1990, pp. 792-801.

* cited by examiner

DRIVER DEVICE AND DRIVING METHOD FOR DRIVING AN LED UNIT

FIELD OF THE INVENTION

The present invention relates to driver device and a corresponding driving method for driving a load, in particular an LED unit comprising one or more LEDs. Further, the present invention relates to a light apparatus.

BACKGROUND OF THE INVENTION

In the field of LED drivers for offline applications such as retrofit lamps, solutions are demanded to cope with high efficiency, high power density, long lifetime, high power factor and low cost, among other relevant features. While practically all existing solutions compromise one or the other requirement, it is essential that the proposed driver circuits properly condition the form of the mains power into the form required by the LEDs while keeping compliance with present and future power mains regulations. Of critical importance is to guarantee a minimum perceptible light flicker (preferably zero)

Typically, two series connected power stages are employed to obtain high power factor while keeping the output power constant throughout a mains cycle (or supply cycle, i.e. the cycle of the mains voltage or the supply voltage). Also known are converters with a single power converting stage that allow high power factors (HPF) by means of integrating a boost converter operating in discontinuous conduction mode. These converters actually combine two power conversion stages.

For some retrofit LED driver products compatibility with phase-cut dimmers is desired, which however were designed to drive much larger loads including resistive and/or reactive components, in particular R, RL, C, or RLC components. Many of those dimmers are of two-wire type.

Enabling maximum dimmer compatibility for low power LED lamp modules (also called LED units hereinafter) involves several problems, which mainly have to do with the power rating mismatch between lamp and dimmer. Such problems include, for instance, to provide sufficient holding currents for thyristors or triacs used in the dimmers, or to deal with unavoidable oscillations between LF filter elements of typical dimmer circuits, which may lead to uncontrolled flicker.

Existing solutions—if available at all—typically show increased losses, such as known bleeder circuits often used in such driver devices (see e.g. JP 2010-2122678), and also require several passive and/or semiconductor components.

SUMMARY OF THE INVENTION

It is an object of the present invention to provide a driver device and a corresponding driving method for driving a load, in particular an LED unit comprising one or more LEDs, particularly providing a high efficiency, long lifetime and low cost. Further, the proposed driver device and method shall comply with a large range of phase-cut dimmers.

Further, it is an object of the present invention to provide a corresponding light apparatus.

According to an aspect of the present invention a driver device is provided comprising:

power input terminals for receiving a periodic supply voltage from an external power supply potentially including a dimmer for dimming said periodic supply voltage, power output terminals for providing a drive voltage and/or drive current for driving a load, a power stage coupled between the power input terminals and the power output terminals for controlling an input current received from said power input terminals to draw a high power from said external power supply in a first mode or to draw a low or no power from said external power supply in a second mode, said high power being higher than the power required for driving said load and said low power being lower than the power required for driving said load, wherein said power stage controls said input current to be in the second mode only for a percentage of half cycle periods of a number of subsequent half cycle periods of said supply voltage, and for providing said drive voltage and/or drive current to said power output terminals in said first mode, and an energy storage unit coupled to said power stage for storing electrical energy provided at said power input terminals in said first mode and for providing stored electrical energy to said load via said power output terminals in said second mode.

According to another aspect of the present invention a corresponding driving method is provided.

According to still another aspect of the present invention a light apparatus is provided comprising a light assembly comprising one or more light units, in particular an LED unit comprising one or more LEDs, and a driver device for driving said light assembly as provided according to the present invention.

Preferred embodiments of the invention are defined in the dependent claims. It shall be understood that the claimed method has similar and/or identical preferred embodiments as the claimed device and as defined in the dependent claims.

In order to comply with a large range of (generally known and widely used) dimmer, in particular phase-cut dimmers, it is proposed that the power stage of a low power driver device runs in either of two modes: In a first mode (also called mode 1) it resembles a constant load as large as incandescent lamps (e.g. 40 W). In the second mode (also called mode 2) the power state is in off-state and forms a high-ohmic load or an open. The power stage thus controls the input current to the driver device to toggle between these two modes, preferably at or close to the zero crossings of the supply voltage.

Further, an energy storage unit, preferably a single capacitor (also called bus capacitor), is used and designed to deliver energy to the load for N−1 half-cycles of the supply voltage and thereby being discharged from a first upper threshold to a second lower threshold. For example, a 4 W lamp is energized for N−1=9 half-cycles of the supply voltage by the energy storage unit (e.g. the bus capacitor) in the second mode, which is charged during one half-cycle of the supply voltage in the first mode, in which a power of 40 W is drawn from the power input terminals. Generally, the number of half-cycles of the first mode is much smaller than the number of half-cycles of the second mode.

The proposed driver device thus ensures that an existing dimmer that is designed to be dimming the supply voltage for use with conventional light bulbs does, if activated in the power supply, correctly work even if the conventional light bulb is now replaced by an LED unit. In the first mode the driver device thus "simulates" a kind of conventional light bulb and draws (much) more power than actually needed for driving the load (i.e. the LED unit) from the power supply. The excessive power is used in this mode to charge the relatively large energy storage unit. Then, in the second mode (which generally has a (much) larger duration than the first mode) only a small or even no power is drawn from the power supply and the load is driven by use of the energy stored in the energy storage unit.

The supply voltage may be a rectified periodic supply voltage provided by a power supply. In case an AC mains voltage is provided as input voltage to the power input terminals, e.g. from a mains voltage supply, a rectifier unit is preferably used (as part of the driver device or as an external unit coupled to the power input terminals) for rectifying a provided AC input voltage, e.g. a mains voltage, into the (rectified periodic) supply voltage. Such a rectifier unit may, for instance, comprise a generally known half-bridge or full-bridge rectifier. The supply voltage thus has the same polarity for either polarity of the AC input voltage.

Alternatively, if e.g. such a rectified periodic supply voltage is already provided at the power input terminals, e.g. from a rectifier (representing said external power supply) provided elsewhere, no further or only general elements (like e.g. an amplifier) are coupled to the power input terminals for shaping the provided supply voltage.

Further, the power supply may comprise a dimmer that might lead to the above described problems that can be avoided by use of the present invention. The driver device according to the present invention, however, also works correctly and efficiently drives the load if the dimmer is not activated or if no dimmer is present in the power supply at all.

According to a preferred embodiment said power stage comprises a controlled switching unit for switching said input current on and off to switch between said first mode and said second mode.

According to another embodiment said power stage comprises a rectifier unit and a controlled switching unit coupled at the input or output of said rectifier unit for switching said input current on and off to switch between said first mode and said second mode.

Preferably a single switch is provided as switching unit, e.g. in a connection line from a power input terminal to the power stage by which said connection line can simply be disrupted. This provides a simple solution for enabling the power stage to quickly switch between said first and second mode. Alternatively, the power stage could be controlled down to zero, i.e. to receive a zero input current, or the power supply could be controlled to deliver a zero input current.

Preferably, said power stage comprises
a half bridge unit comprising a first switching element and a second switching element coupled in series between a high voltage node and a low voltage node and having a switch node between said first and second switching elements,
a boost input filter unit comprising a first inductor coupled between the output of said input stage and said half bridge unit, and
a buck output filter unit comprising a second inductor coupled between said half bridge unit and a power output terminal.

Thus, according to this embodiment an offline synchronous boost converter is integrated into a synchronous buck converter. To the power output terminals a load (e.g. a HV LED unit) is connected.

The separate capacitor voltage level (i.e. the level of the voltage across the power storage unit, which is preferably a capacitor) allows minimizing the stored energy. The buck current allows for lossless switching of both switching elements (preferably transistors, e.g. MOSFETS, said switching element forming a half bridge unit), which means high efficiency even at high frequencies, which allows for miniaturized inductors.

There are various basic configurations of the boost integrated synchronous buck converter (BSB) provided as different preferred embodiments that cope with various load and input voltage ranges. All of them can be controlled over full load range down to virtually zero load current by means of manipulating the duty cycle only or the switching frequency or by burst mode operation.

Preferably, the switching elements together form a half bridge unit (also called switching unit, or sometimes called half bridge). But generally, the switching elements can be implemented in various ways, e.g. including transistors (e.g. MOSFETs) or other controlled switching means.

In an alternative embodiment said power stage comprises an input power stage for controlling the input current and an output power stage for controlling the drive voltage and/or drive current. The advantage of a two stage supply here is that both input and output current can be controlled independently, which allows better shaping input current and eases bus voltage control.

Preferably, said input power stage comprises an inductor coupled between a power input terminal and a first switching node, said first switching node being arranged between a first diode and a first switching unit coupled in series, and/or wherein said output power stage comprising an inductor coupled between a power output terminal and a second switching node, said switching node being arranged between a second diode and a second switching unit coupled in series. Thus, a boost converter or a fly-back converter may be used as input power stage, just to give two examples. Further, together with an additional switch, a buck or a buck-boost converter can be employed as input power stage.

As briefly mentioned above it is preferred that the power stage is adapted for controlling said input current received from said power input terminals to switch between said first mode and said second mode only at zero crossings of the periodic supply voltage. This, however, requires knowing the points in time of these zero crossing. One option is to estimate or calculate these points in time based on the knowledge about the periodicity and frequency of the supply voltage.

Another option is that said power stage is adapted for estimating the points in time of said zero crossings and for controlling said input current to switch between said first mode and said second mode shortly before a zero crossing. Since at or around the zero crossings the power drawn from the power supply is low or even zero anyhow this has no negative effect on the functioning of the driver device and the power supply or a dimmer. This option, however, provides the possibility that the zero crossing is not missed even if the estimated point in time of the zero crossing at which the switching shall be made is not exactly correct. "Shortly before a zero crossing" here may be understood as a time duration in the range from 0 to 3 ms, preferably in the range from 0.5 to 2 ms (e.g. 1 ms), before a zero crossing.

Still another option is that said power stage is adapted for tracking the points in time of said zero crossings by briefly controlling said input current to draw a high power from said external power supply also during said second mode at regularly spaced or all zero crossings. Again, as mentioned above, at or around the zero crossings the power drawn from the power supply is low or even zero anyhow this has no negative effect on the functioning of the driver device and the power supply or a dimmer. This option, however, provides the possibility that the points in time of the zero crossings can be tracked and corrected if needed so that the estimation of the point(s) in time of the subsequent zero crossing(s) can be made more accurately. "Briefly" here may be understood as a time duration in the range from 0 to 3 ms, preferably in the range from 0.5 to 2 ms (e.g. 1 ms). The high power that is briefly drawn is preferably done shortly before a zero crossing, which may here also be understood as a time duration in the range from 0 to 3 ms, preferably in the range from 0.5 to 2 ms (e.g. 1 ms), before a zero crossing. This embodiment is preferably relevant for trailing edge (transistor) dimmers, also because they need some supply power which they typically draw around the zero crossings.

In one embodiment said power stage is adapted for controlling said input current received from said power input terminals to switch between said first mode and said second mode based on a dimmer type information indicating the type of dimmer used for dimming said supply voltage. Said dimmer type information could be available to the power stage, or the driver device could even comprise means for determining the type of dimmer, e.g. by monitoring the supply voltage to see if, for instance, in case of activated dimming there is a leading edge or trailing edge phase cut dimmer. Thus, based on this knowledge the points in time of the zero crossings of the supply voltage can be determined at which the switching between the first and second mode is preferably made.

In another embodiment said power stage is adapted for controlling said drive current and/or drive voltage based on a dimming information indicating a dimming attenuation factor by which the supply voltage is dimmed. Said dimming information may be derived from said dimmed supply voltage and/or dimmed supply current during said first mode or may be derived from the ratio of time over the time period of two half cycles of said supply voltage, during which time of said time ratio said dimmed supply voltage and/or dimmed supply current is above a predetermined supply voltage threshold. Thus, the drive current and/or drive voltage is finally controlled based on a signal derived from the supply voltage representing the amount of applied dimming, e.g. the conduction angle. In other words, the control is not fixed and static, but is variable dependent on the amount of dimming applied to the supply voltage.

In another embodiment said input stage is adapted for controlling said input current received from said power input terminals to switch between said first mode and said second mode based on an energy storage information indicating the current voltage across said energy storage unit, wherein said input current is controlled to swing between a lower and an upper energy storage threshold voltage. If the amount of dimming is increased the difference between lower and upper energy storage threshold voltages is preferably decreased.

Three values are subject of control: input current (mode 1 or 2), LED drive current and bus voltage. The bus capacitor is designed to store at least Ebus=(N−1)*Po*Tper with N=Pdim/Po, i.e. the ratio between minimum required dimmer power over the rated lamp power (Po), wherein Tper is half the supply period. To store that energy the bus capacitor may swing between a lower and an upper bus voltage level.

There are various ways to operate, e.g.

i) Cycle skipping control: The frequency of mode 1 cycles is kept as high as the upper bus voltage limit allows. In dimmed mode (a<1) the resulting lower bus voltage is above the lower (operational) limit.

ii) Threshold control: The bus voltage will always swing between fixed limits. Thus, at dimming levels a<1 the number of discharging cycles increases (N/a).

iii) Mixed operation: Operation type i) can be advantageous in case of trailing edge (transistor) dimmers, since their internal supply requires mode1 operation. Operation type ii) can result in higher overall efficiency and applies well to typical leading edge (triac) dimmers.

Preferably, if a dimming action (e.g. a phase-cut operation) is detected the lamp current reference is reduced and still the voltage across the energy storage unit may swing between those thresholds now taking about 1/a charging and N/a discharging half-cycles if a is the dimming attenuation factor. Alternatively, a single charging half-wave operation mode (i.e. charging of the energy storage unit in a single half-cycle of the supply voltage) can be used.

Generally, in an embodiment said power stage is adapted for controlling said input current to follow said supply voltage in said first mode. This is particularly true in case the switching between the different modes is effected by use of a simple switch. In other embodiments, however, e.g. if a more complex input power stage is available, the input current can be modified, e.g. to have the form of a periodic rectangular or trapezoidal input current. The minimum power Pdim required to draw from the dimmer for its proper operation can be somewhat reduced with respect to the case with sinusoidal currents. This means a reduced storage demand, i.e. smaller capacitors.

In an embodiment said power stage is adapted for controlling said input current to draw a high power from said external power supply in said first mode, wherein said high power corresponds to a dimmer power, wherein said dimmer is designed to deliver said dimmer power as a minimum value, typically called the minimum required load. Thus, the power stage almost exactly simulates a load (the minimum load) for which the dimmer is designed so that the dimmer can correctly work even if, e.g. instead of an incandescent light bulb for which the dimmer is designed, an LED unit is provided as load. The information about the amount of power to be drawn from the power supply/dimmer can either be provided to the power stage in advance, e.g. by making a suitable setting, or can be determined by the driver device itself from a measurement of the supply voltage and input current Still further, in an embodiment said energy storage unit, which is preferably a single capacitor, is adapted to store an amount of electrical energy that is sufficient to drive said load for the whole period of time during which the input current is controlled to be in the second mode. The ratio of the time durations of the first and second mode is preferably determined such that the energy storage unit charges up by the same extent during the first mode, by which it discharges during the second mode.

BRIEF DESCRIPTION OF THE DRAWINGS

These and other aspects of the invention will be apparent from and elucidated with reference to the embodiment(s) described hereinafter. In the following drawings.

DETAILED DESCRIPTION OF THE INVENTION

Figure 1:
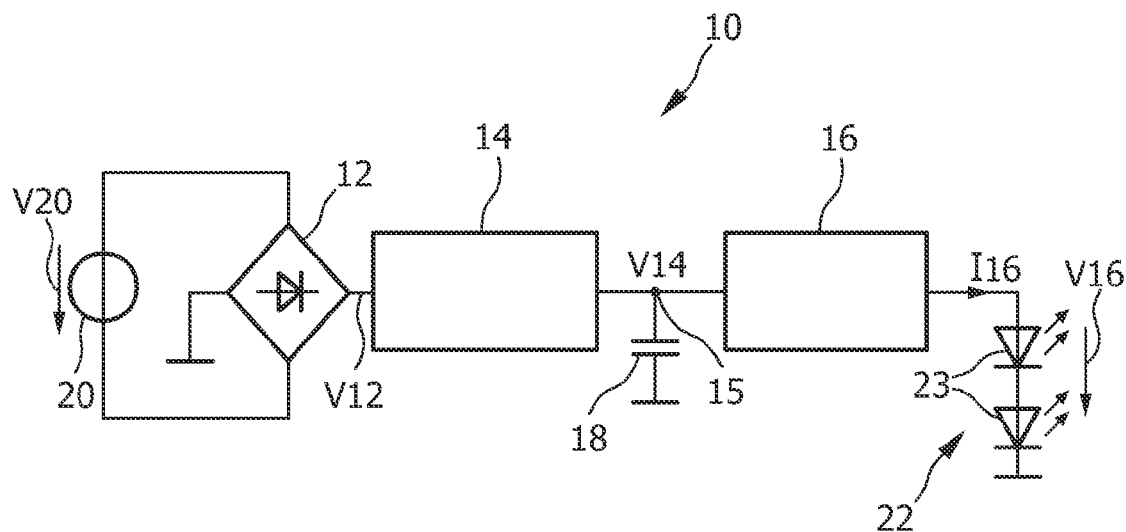
FIG. 1 shows a schematic block diagram of a known two stage driver device.

An embodiment of a known two stage driver device 10 is schematically shown in FIG. 1. Said driver device 10 comprises a rectifier unit 12, a first stage preconditioning unit 14 coupled to the output of the rectifier unit 12, a second stage conversion unit 16 coupled to the output of the first stage preconditioning unit 14 and a charge capacitor 18 coupled to the node 15 between said first stage preconditioning unit 14 and said second stage conversion unit 16. The rectifier unit 12 preferably comprises a rectifier unit, such as a known full-wave bridge or half-wave bridge rectifier, for rectifying an AC input voltage V20 provided, e.g., from an external mains voltage supply 20 into a rectified voltage V12. The load 22 is, in this embodiment, an LED unit comprising two LEDs 23 is coupled to the output of the second stage conversion unit 16 whose output signal, in particular its drive voltage V16 and its drive current 116, is used to drive the load 22.

Figure 2A:
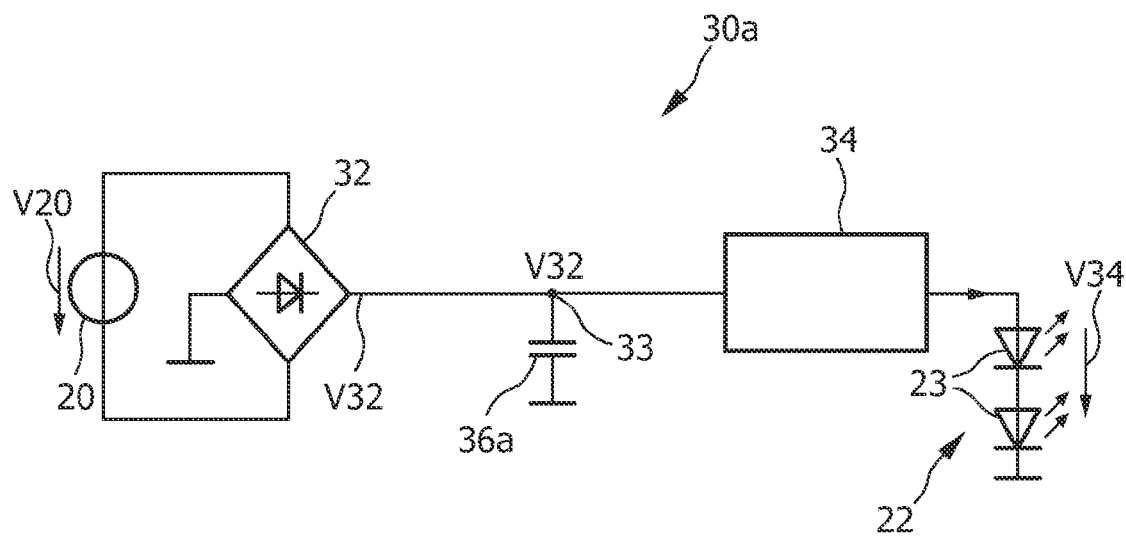
FIG. 2a shows a schematic block diagram of a known single stage driver device with input storage capacitor.
Figure 2B:
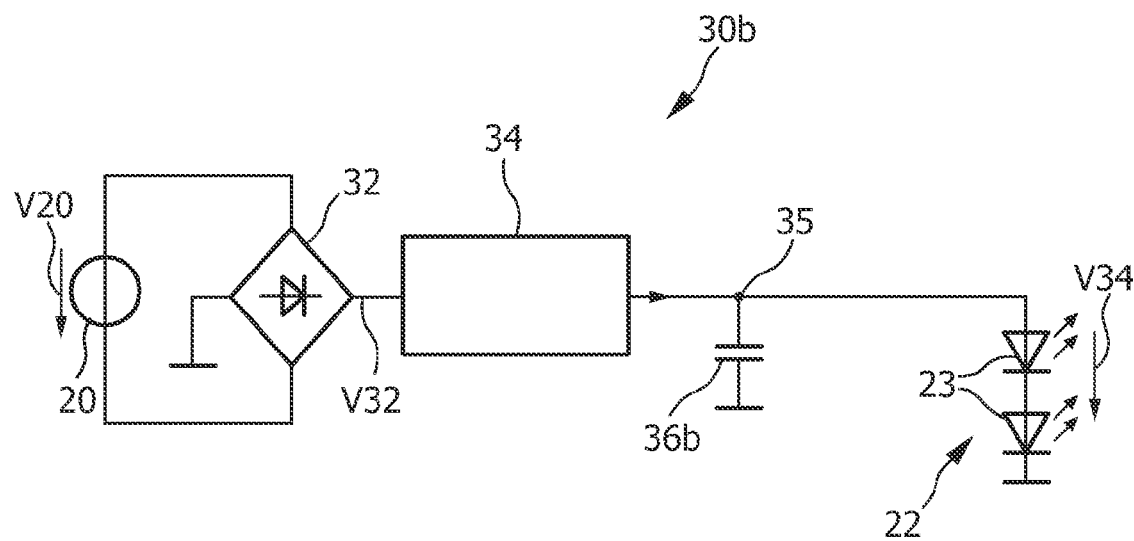
FIG. 2b shows a schematic block diagram of a known single stage driver device with output storage capacitor.

The first stage preconditioning unit 14 preconditions the rectified voltage V12 into an intermediate DC voltage V14, and the second stage conversion unit 16 converts said intermediate DC voltage V14 into the desired DC drive voltage V16. The charge capacitor 18 is provided to store a charge, i.e. is charged from the intermediate DC voltage V14, thereby filtering the low frequency signal of the rectified voltage V12 to ensure a substantially constant output power of the second stage conversion unit 16, in particular a constant drive current 116 through the load 22. These elements 14, 16, 18 are generally known and widely used in such driver devices 10 and thus shall not be described in more detail here. Generally, the driver device 10 complies with the aforementioned demand of high power factor and low flicker at the expense of larger space requirements and cost, which might be drastically limited particularly in retrofit applications. Embodiments of known single stage driver devices 30a, 30b are schematically shown in FIG. 2a and FIG. 2b. Said driver device 30 comprises a rectifier unit 32 (that may be identical to the rectifier unit 12 of the two stage driver device 10 shown in FIG. 1) and a conversion unit 34 (e.g. flyback converter for the embodiment shown in FIG. 2b or a buck converter for the embodiment shown in FIG. 2a) coupled to the output of the rectifier unit 32. Further, in the embodiment shown in FIG. 2a a charge capacitor 36a (representing a low frequency input storage capacitor) is coupled to the node 33 between said rectifier unit 32 and said conversion unit 34 is provided. In the embodiment shown in FIG. 2b the charge capacitor 36b (representing a low frequency output storage capacitor) is coupled to the node 35 between said conversion unit 34 and the load 22. The rectifier unit rectifies an AC input voltage V20 provided, e.g., from an external mains voltage supply (also called power supply) 20 into a rectified voltage V32. The rectified voltage V32 is converted into the desired DC drive voltage V34 for driving the load 22.

The storage capacitors 18 (in FIG. 1) and 36a, 36b (in FIGS. 2a, 2b) are mainly provided to filter out the low frequency component of the rectified voltage V12 in order to allow for a constant current into the load. Such capacitors are therefore large, particularly when placed in parallel to the load and when such load is an LED.

Driver devices as shown in FIGS. 1 and 2 are, for instance, described in Robert Erickson and Michael Madigan, "Design of a simple high-power-factor rectifier based on the flyback converter", IEEE Proceedings of the Applied Power Electronics Conferences and Expositions, 1990, pp. 792-801.

Most of those single stage driver devices 30a, b can, although featuring a lower number of hardware components compared to two stage driver devices as exemplarily shown in FIG. 1, generally not offer a high power factor and a low perceptible flicker simultaneously due to limitations in the size of the charge capacitor, which must filter out the low frequency component of the AC input voltage. In addition, single stage driver devices may critically compromise size, lifetime and the maximum temperature operation of the load (e.g. a lamp) due to the use of large storage capacitors used to mitigate perceptible flicker. Further, the known driver devices are generally not compatible with existing phase-cut dimmers, which is one of the main problems dealt with by the present invention.

Figure 3:
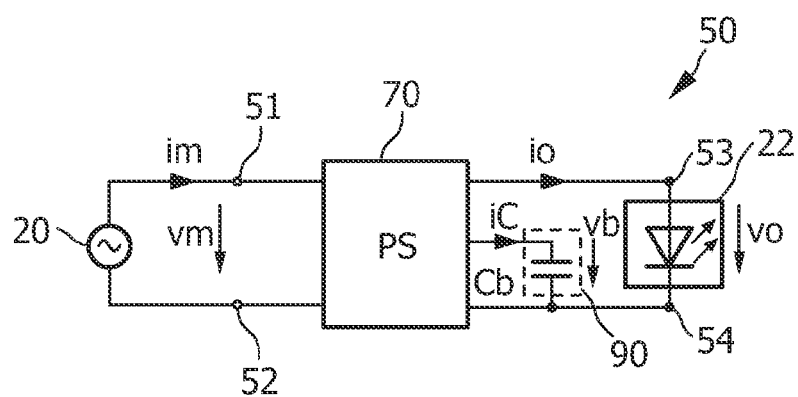
FIG. 3 shows a schematic block diagram of the general layout of a driver device according to the present invention.

FIG. 3 shows the general layout of a driver device 50 according to the present invention. It comprises power input terminals 51, 52 for receiving a periodic supply voltage vm from an external power supply 20 (e.g. a mains voltage supply), which is preferably rectified by an internal or external rectifier (not shown in this embodiment). The external power supply 20 may further comprise a dimmer (not shown), e.g. a phase-cut dimmer (for instance, a leading edge or trailing edge phase-cut dimmer) of the generally known type, for dimming the provided supply voltage. Such a dimmer often leads to problems when used with conventional driver devices as mentioned above. Those problems exist particularly in cases where an existing dimmer that is generally designed for use with conventional light bulbs shall be used for dimming one or more LED lamps. Those problems are avoided in a driver device according to the present invention.

The driver device 50 further comprises power output terminals 53, 54 for providing a drive voltage vo and/or a drive current io for driving a load 22.

A power stage 70 is coupled between the power input terminals 51, 52 and the power output terminals 53, 54 for controlling an input current im received from said power input terminals 51, 52 to draw a high power from said external power supply 20 in a first mode or to draw a low or no power from said external power supply 20 in a second mode. Said high power is higher than the power required for driving said load 22 and said low power is lower than the power required for driving said load 22. The high power is particularly as high as the power that is usually drawn from the driver device, when a conventional load, such as a conventional light bulb, is coupled to the driver device so that during the first mode the driver device "simulates" such a conventional load to the power supply, and particularly an existing dimmer. The excessive power that is not required to drive the load is stored in an energy storage unit 90.

The power stage 70 controls the input current im to be in the second mode only for a percentage of half cycle periods of a number of subsequent half cycle periods of said supply voltage. Further, the power stage 70 provides said drive voltage and/or drive current to said power output terminals 53, 54 in said first mode. More detailed embodiments of the power stage 70 will be explained below.

The energy storage unit 90 comprises in this embodiment a single capacitor Cb (also called bus capacitor) and is coupled to said power stage 70 for storing electrical energy provided at said power input terminals 51, 52 in said first mode and for providing stored electrical energy to said load 22 via said power output terminals 53, 54 in said second mode. Said energy storage unit 90 is thus loaded with electrical energy during said first mode while it provides its stored electrical energy to said load 22 via said power output terminals 53, 54 when power stage 70 controls said input current im to be in the second mode.

Figure 4:
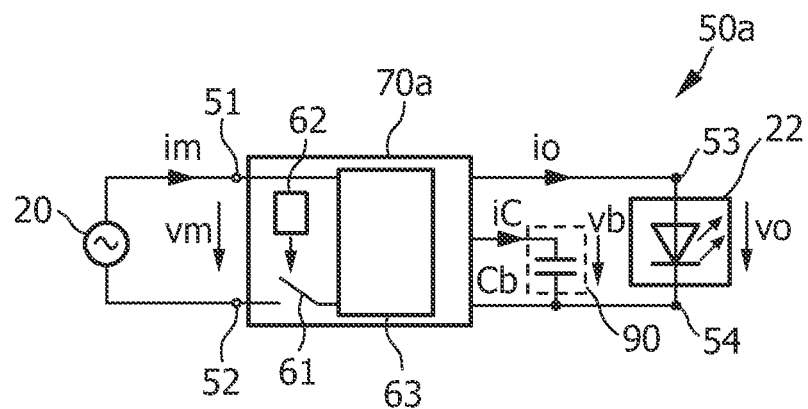
FIG. 4 shows a schematic block diagram of a first embodiment of a driver device according to the present invention.

A first more detailed embodiment of a driver device 50a according to the present invention is shown in FIG. 4. In this embodiment the power stage 70a comprises a single switching element 61 in the coupling line between power input terminal 52, which is coupled to the lower power terminal of the power supply 20, and the output power stage 63, i.e. including the main elements of the power stage 70a for controlling the drive current and/or drive voltage. For controlling said switching element an appropriate control unit 62 is preferably provided in addition, which control unit 62 may be part of the power stage 70a or may be an external element. Further, said control unit 62 may be realized by a controller in hardware, by an appropriately programmed microprocessor or computer or in any other suitable way. To switch between the first mode and the second mode the control unit 62 thus controls the switch 61 to connect or disconnect the power stage 70a from the power supply 20. This embodiment thus provides a simple and cheap solution for enabling the desired switching between the first and second mode.

Figure 5:
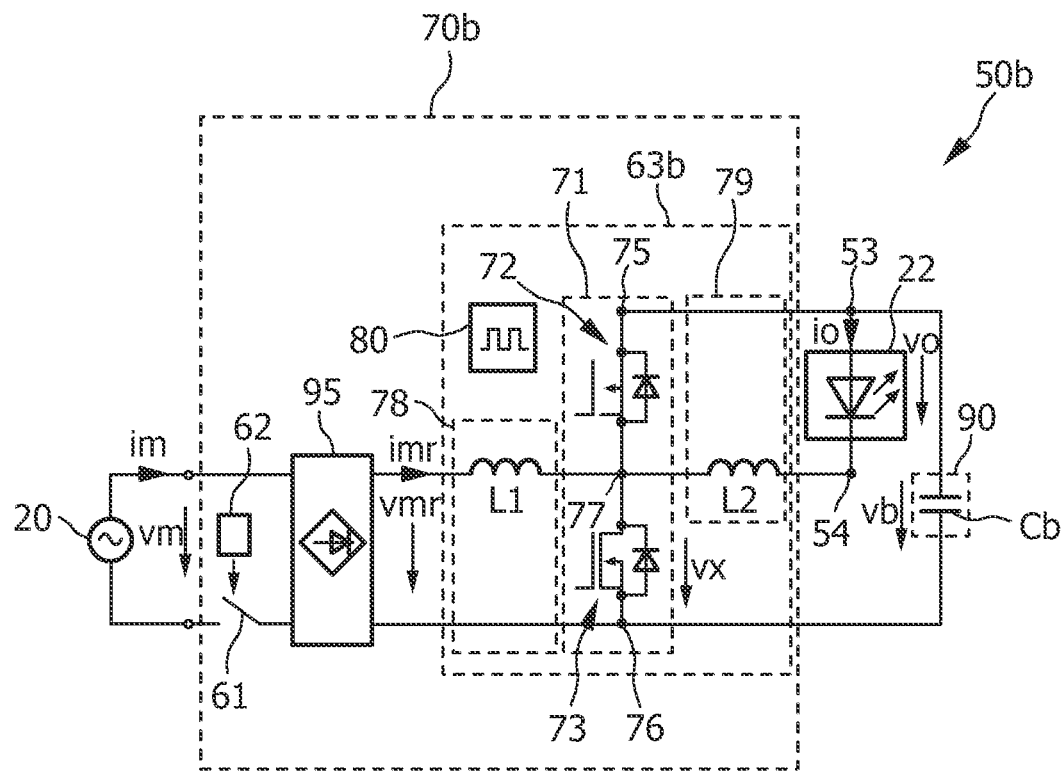
FIG. 5 shows a more detailed circuit diagram of said first embodiment shown in FIG. 4.

FIG. 5 shows a second embodiment of a driver device 50b according to the present invention which particularly shows an exemplary implementation 70b of the power stage 70a. Further, in this embodiment a rectifier unit 95 is provided that rectifies said controlled input current imc into a (periodic) rectified control voltage imr. The output power stage 63b, which is an exemplary implementation of the output power stage shown in FIG. 4, comprises a half bridge unit 71 (also called switching unit or half bridge) comprising a first switching element 72 and a second switching element 73, which are coupled in series between a high voltage node 75 and a low voltage node 76 and form a switch node 77 between said first and second switching elements 72, 73. A boost input filter unit 78 comprising a first inductor L1 is coupled between said rectifier unit 95 and said half bridge unit 71. A buck output filter unit 79 comprising a second inductor L2 is coupled between said half bridge unit 71 and a power output terminal 53, 54.

The input terminals of the boost input filter unit 78 are coupled in this embodiment to the output terminals of the rectifier unit 95. The output terminals of the boost input filter unit 78 are coupled to the switch node 77 and the low voltage node 76 of the half bridge unit 71. The input terminals of the buck output filter unit 79 are coupled to the high voltage node 75 and the switch node 77 of the half bridge unit 71.

The output terminals of the buck output filter unit 79 are coupled to the power output terminals 53, 54 and thus to the load 22. The energy storage unit 90 is coupled between the high voltage node 75 and the low voltage node 76 in this embodiment.

Finally, another control unit 80 (implemented e.g. as a controller, processor or computer that is appropriately designed or programmed; it might also be coupled to the control unit 62 or implemented as a common component) is provided for controlling said switching elements 72, 73.

The boost inductor L1 is designed to convert the rated dimming power Pdim, which may be N times the rated lamp power Po in order to fully charge the bus capacitor Cp only each N-th half cycle (N being an integer equal to or larger than 1) of the supply voltage. Other locations for the switch 61 are possible, e.g. behind the rectifier unit 95 and/or an EMI filter (not shown) that may be coupled between the power input terminals 51, 52 and the output power stage 63b. In the first mode the driver device typically resembles a resistive load.

Figure 6:
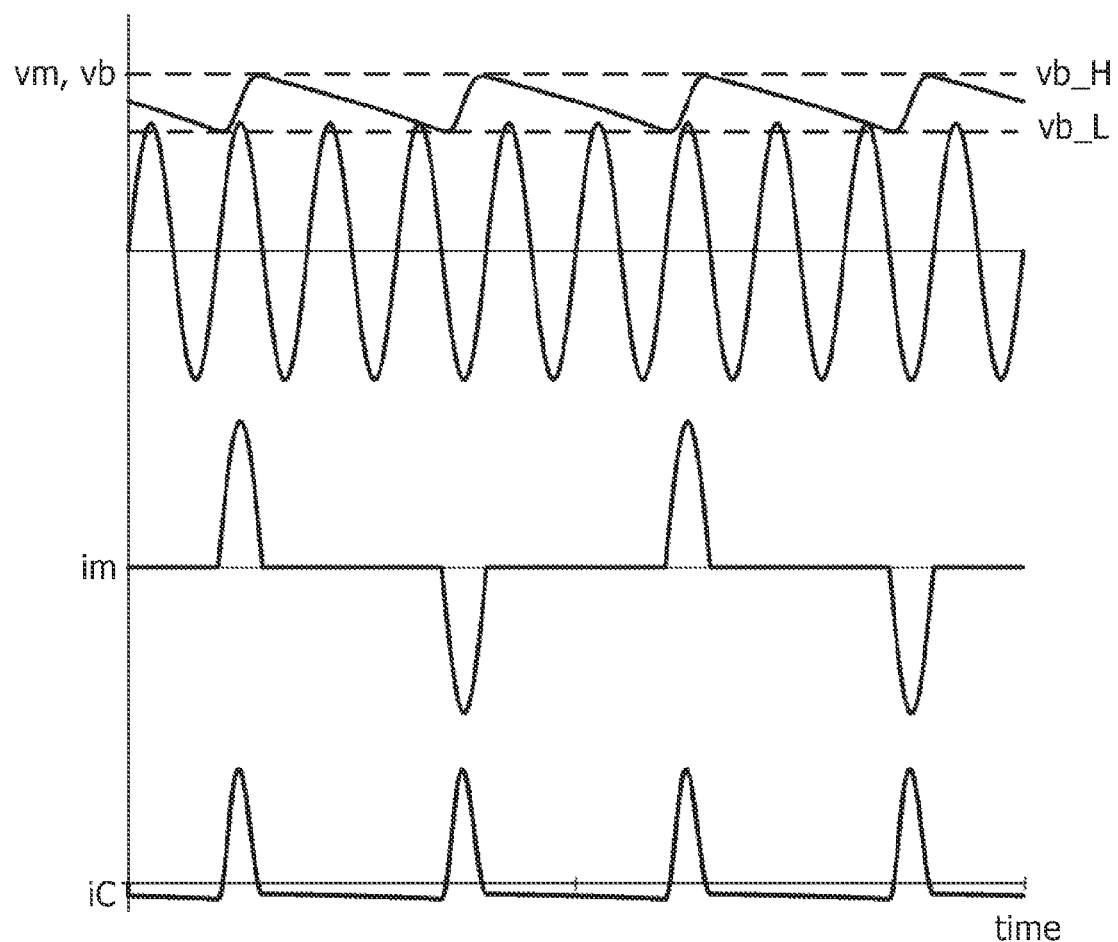
FIG. 6 shows diagrams of voltages and currents in said first embodiment at non-dimmed operation.

FIG. 6 shows possible LF (low frequency) waveforms at non-dimmed operation for several supply cycles assuming the values of Plamp(power of the lamp)=6 W, Pin(input power in mode 2/mode 1)=0 W/30 W (1.8 kΩ), Cb=4.7 μF, vb_H=440V, vb_L=300V. The supply current im is either zero (in mode 2) or follows the supply voltage (R=1.8 kOhm, 30 W) for each fifth half-wave of the periodic supply voltage, which results in steep voltage rise of bus voltage vb across the bus capacitor Cp. During off-mode (i.e. mode 2) the capacitor Cp slowly discharges to the load 22, which is assumed constant and fully on. The reference signal representing the dimming angle or attenuation is assumed 100% (a=1).

Figure 7:
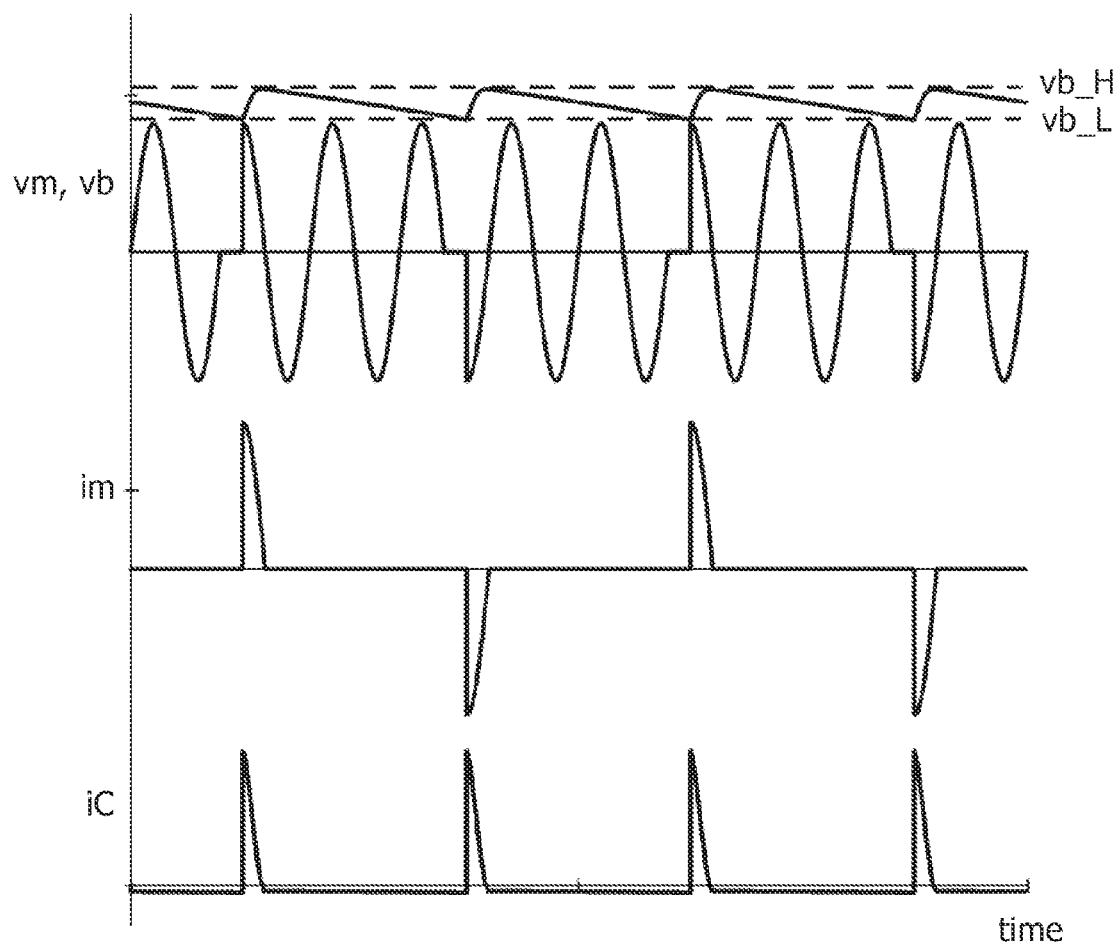
FIG. 7 shows diagrams of voltages and currents in said first embodiment at dimmed operation.

FIG. 7 shows for the same driver device waveforms at dimmed operation assuming the values of Plamp=3 W, Pin=0 W/30 W (1.8 kΩ), Cb=4.7 μF, vb_H=410 V, vb_L=340V. These waveforms now result from operation at 90° dimming angle (that here is translated to a load attenuation a=0.5) of a leading edge dimmer as voltage vm indicates. Bus voltage vb swings between voltages vb_H and vb_L. The dimming action is only visible in the supply voltage vm during the charging cycles (i.e. in mode 1) with high substantial supply current im.

The first and second embodiments of the present invention thus provide a driver with input switch to control the input current and to operate in supply cycle skipping mode, a storage capacitor to supply the load for several supply cycles, while the driver is disconnected from the supply, and a power stage controlling the output current. The input current has two modes, i.e. a high power mode (mode 1) in which the input current resembles a constant high power load (e.g. resistive impedance of an incandescent lamp), and an off mode (mode 2) in which the power stage forms a high ohmic resistor or an open.

Figure 8:
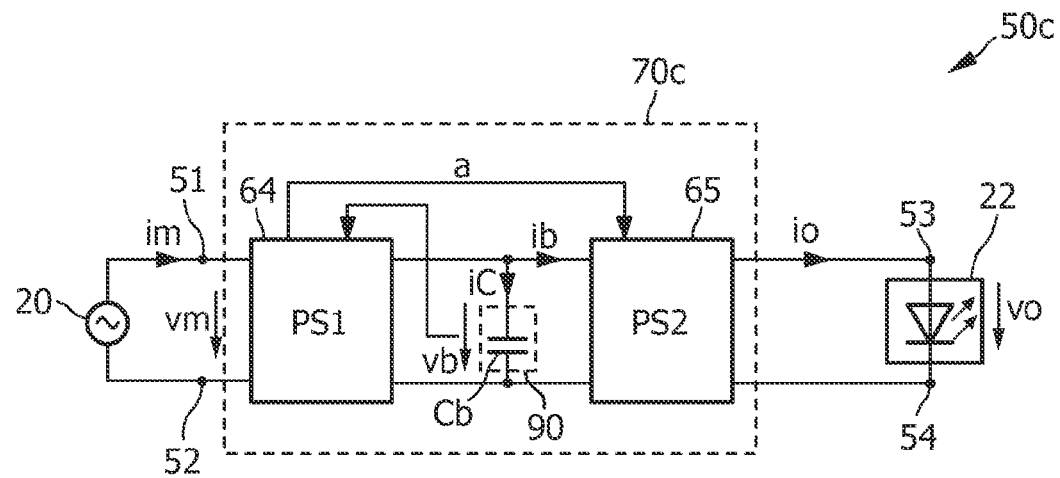
FIG. 8 shows a schematic block diagram of a second embodiment of a driver device according to the present invention.

Toggling between the modes preferably occurs only at zero crossings of the supply voltage. Further, the bus capacitor is designed to store energy for N−1 cycles associated with a voltage swing of e.g. factor 1.5. In an embodiment the bus voltage vb is watched and controlled to swing around or between preset values. Further, in an embodiment the set point for the load current reference value is derived from the supply voltage as supplied by the dimmer during mode 1, e.g. the ratio of the time during which vm exceeds a threshold over the period time. FIG. 8 shows a third embodiment of a driver device 50c according to the present invention comprising a input power stage 64 and an output power stage 65 representing the power stage 70c. Between said input power stage 64 and the output power stage 65 the energy storage unit 90 (including a single bus capacitor Cb in this embodiment) is coupled. In this embodiment the input power stage 64 does not simply comprise a single switch like in the embodiments shown in FIGS. 4 and 5, but comprises some more functionalities for controlling the input current im.

For instance, while in an embodiment the input current im is controlled in said first mode to follow said supply voltage vm (e.g. to show the form of a sine wave if the supply voltage is a sine wave), in another embodiment the input current im is controlled to have a different waveform, e.g. a rectangular or trapezoidal form or any other desired form. The input power stage may thus, for instance, comprise a boost converter or other electronics as conventionally used in a driver device.

Further, in an embodiment the input power stage 64 may not only control the input current im to be zero in the second mode, but may also let the input current be a small current to draw a low power (i.e. a power much lower that the high power drawn in the first mode, e.g. less than 10% of the power drawn in the first mode) from the power supply 20. Generally, if at all, power is only drawn during the second mode around the crossings at low supply voltage to support certain types of dimmers.

Figure 9:
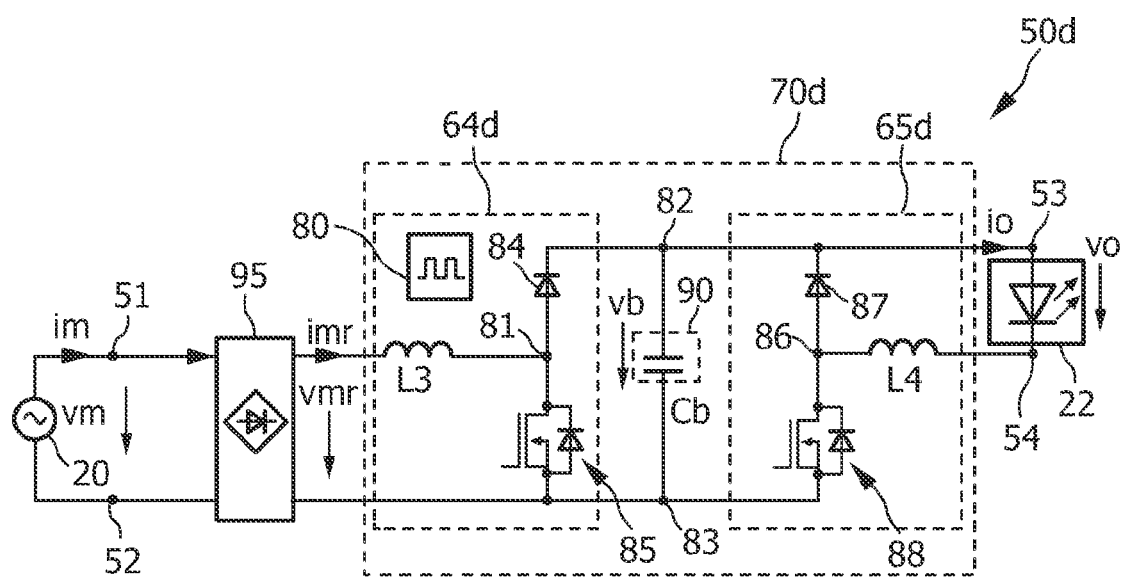
FIG. 9 shows a more detailed circuit diagram of said second embodiment shown in FIG. 8.

FIG. 9 shows a fourth embodiment of a driver device 50d according to the present invention which particularly shows an exemplary implementation 64d of the input power stage 64 and an implementation 65d of the output power stage 65d together representing an implementation 70d of the power stage 70c. Further, a rectifier unit 95 is provided like in the embodiment shown in FIG. 5 for rectifying the input current im into the rectified input current imr.

The input power stage 64d comprises a first inductor L3 coupled between an output of the rectifier unit 95 and a first switching node 81. Between said first switching node 81 and a high voltage node 82 a first diode 84 is coupled, and between said first switching node 81 and a low voltage node 83 a first switching unit 85 is coupled. Between said high voltage node 82 and said low voltage node 83 the energy storage unit 90 is coupled.

The output power stage 65d comprises a similar circuitry as the input power stage 64d, but in mirror symmetry. In particular, a second inductor L4 is coupled between a second switching node 86 and the low voltage power output terminal 54. Between said second switching node 86 and the high voltage node 82 a second diode 87 is coupled, and between said second switching node 86 and the low voltage node 83 a second switching unit 88 is coupled.

Both the input power stage and the output power stage are generally well known converter types and also used in known LED drivers. This includes the above described combination, which is quite common, so that no further details shall be explained here. The input power stage is a boost (or step up) converter here, and the output power stage is a buck (or step down) converter.

The switching between the first and second mode is effected by the input power stage 64d by controlling the first switching unit 85 which is (like the second switching unit 88) switched under control of the control unit 80. When said first switching unit 85 is controlled to be non-conductive the controlled input current imr is allowed to pass through the diode 84 and to both drive the load 22 and charge the capacitor Cp, i.e. the first mode is set. When said first switching unit 85 is controlled to be conductive the controlled input current imr is not allowed to pass through the diode 84, but runs through the first switching unit 85 and back to the power supply 20, i.e. the second mode is set.

Further, in the first mode the second switching unit 88 is controlled to be conductive. In case no extra switch 61 is used, the lower bus voltage level is set above peak supply voltage, which means that is controlled by either operating the input power stage as normal boost converter for the first mode (via switching unit 85) or keep switching unit 85 open; i.e. the input current is zero for the second mode.

Figure 10:
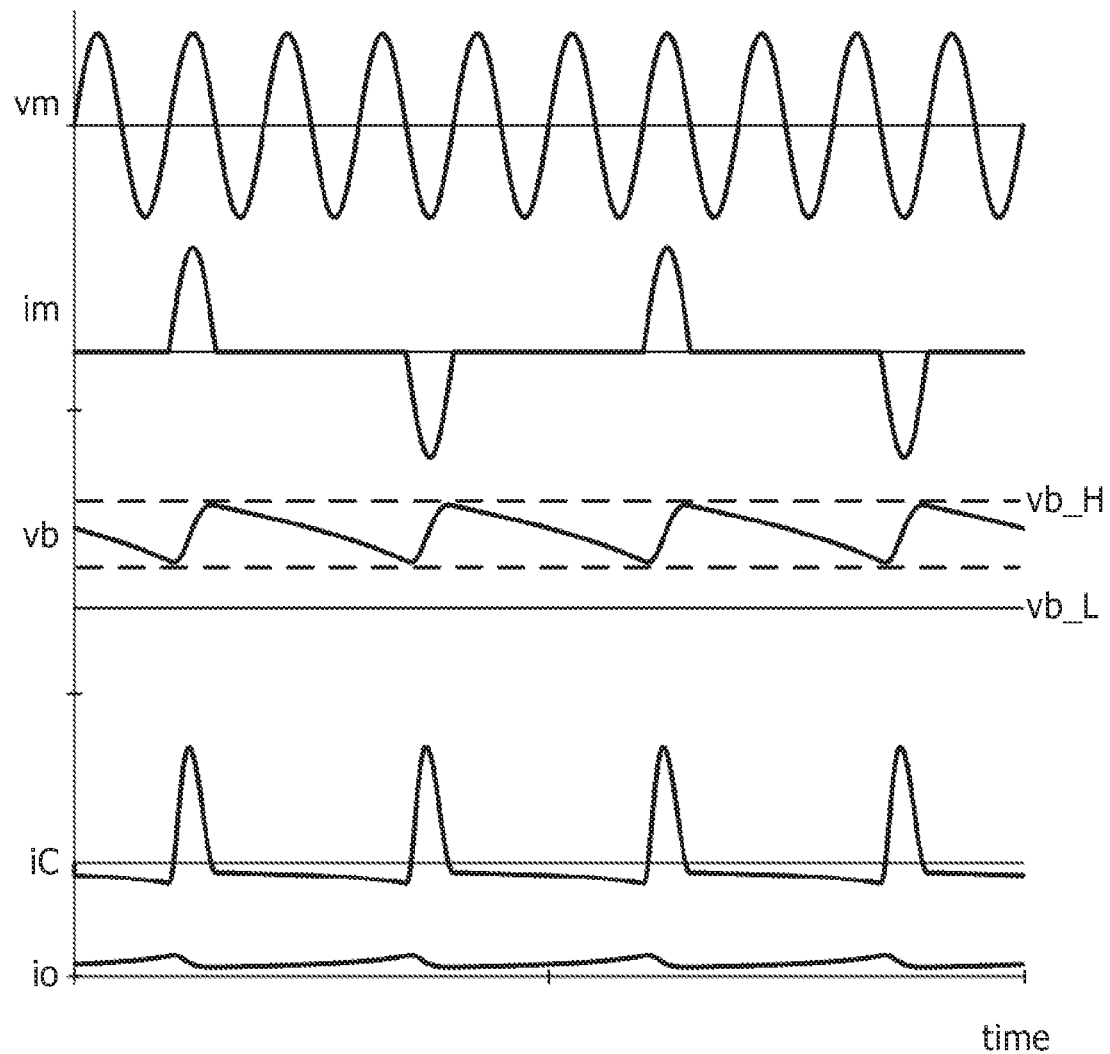
FIG. 10 shows diagrams of voltages and currents in said second embodiment at non-dimmed operation.

FIG. 10 shows for the embodiment shown in FIG. 8 the resulting waveforms at non-dimmed operation assuming the values Plamp=6 W, Pin=0 W/30 W (1.81 kΩ), Cb=4.7 μF, vb_H=380V, vb_L=140V. The supply current im is either zero (mode 2) or follows the supply voltage (R=1.8 kOhm, 30 W) for each fifth half-wave of the supply cycle, which results in steep voltage rise of bus voltage vb. During off-mode the capacitor slowly discharges to the load, which is assumed constant and fully on. The reference signal representing the dimming angle or attenuation is assumed 100% (i.e. a=1).

Figure 11:
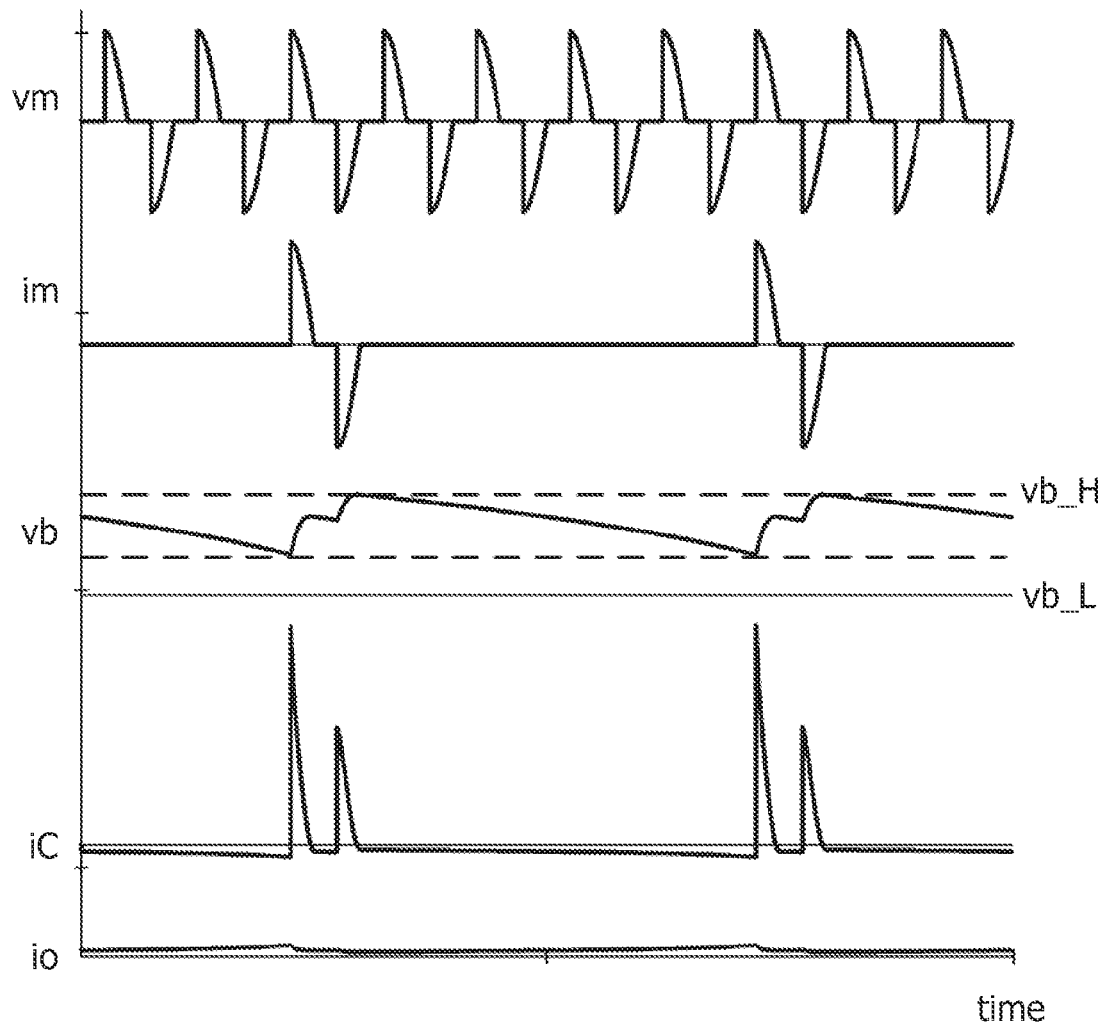
FIG. 11 shows diagrams of voltages and currents in said second embodiment at dimmed operation in a first operational mode.

FIG. 11 shows for the same device waveforms at dimmed operation in first (bus voltage control) mode assuming the values Plamp=3 W, Pin=Pin=0 W/30 W (1.8 kΩ), Cb=4.7 μF, Vbmax=380V, Vbmin=140V. These waveforms now result from operation at 90° dimming angle (that here is translated to a load attenuation a=0.5) of a leading edge dimmer as voltage vm indicates The bus voltages vb still swings between threshold voltages vb_H and vb_L, which means that charging is performed during two half-cycles of vm (instead of 1) and discharging takes 8 cycles (instead of 4).

Figure 12:
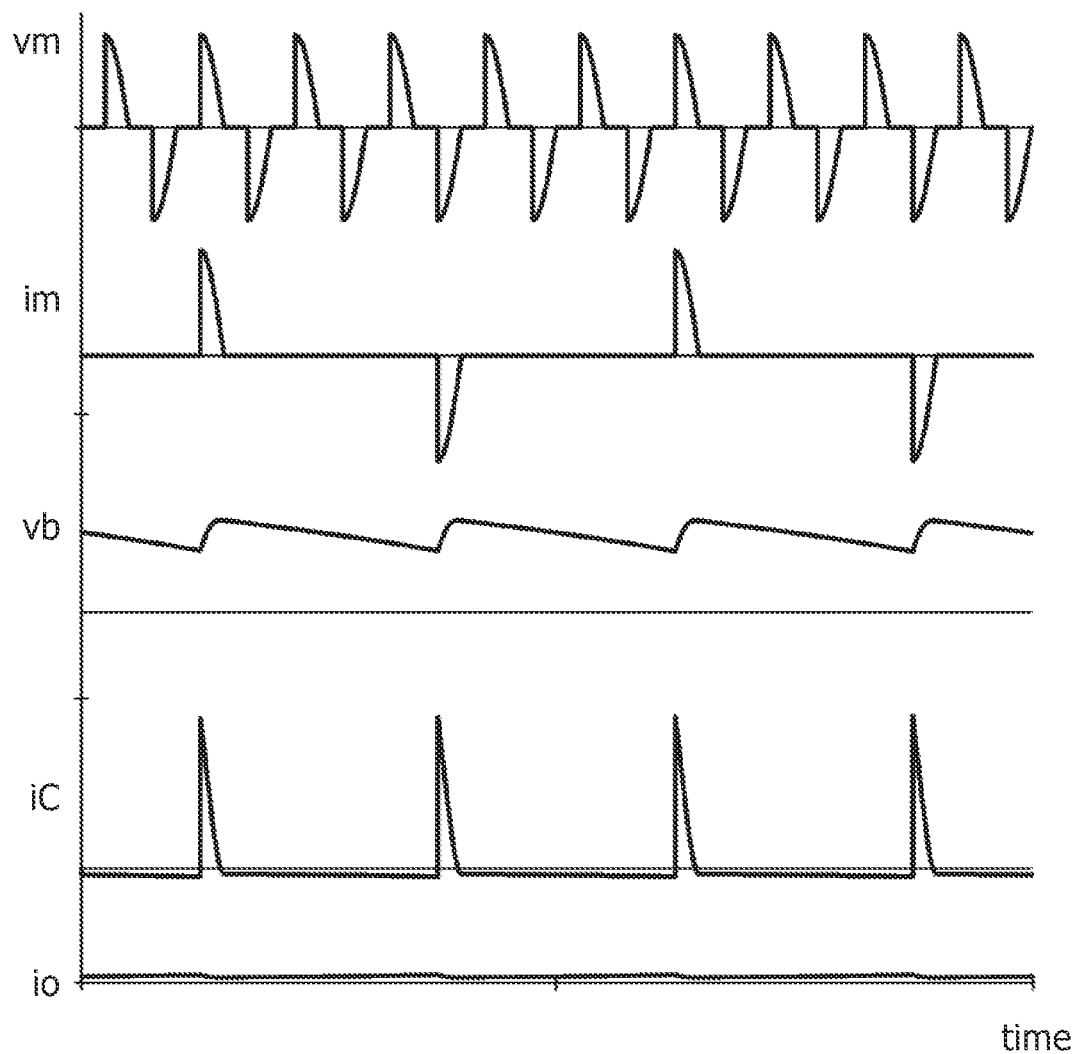
FIG. 12 shows diagrams of voltages and currents in said second embodiment at dimmed operation in a second operational mode.

FIG. 12 shows for the same device waveforms at dimmed operation in second (single pulse) mode assuming the values Plamp=3 W, Pin=Pin=0 W/30 W (1.8 kΩ), Cb=4.7 μF, Vbmax=320V, Vbmin=210V. These waveforms thus result from an alternative control than the waveforms shown in FIG. 10. Still at 50% load charging is done within a single half-cycle only, which is associated to a reduced bus voltage stroke.

The third and fourth embodiments of the present invention thus provide a driver with an input power stage module controlling the input current, bus capacitor and output stage controlling the output current. As explained above the input current has two modes, which are preferably toggled at zero crossings of the supply voltage. The bus capacitor is designed to store energy for N−1 cycles associated with a voltage swing of e.g. factor 2 to maximize component exploitation.

The upper and lower thresholds are controlled by the toggling of the input current mode. The set point for the load current reference value is derived from the supply voltage as supplied by the dimmer; e.g. the ratio of the time during which vm exceeds a threshold over the period time.

In summary, according to a preferred embodiment of the present invention the control (of the input current) masters three main tasks, i.e. i) during start up detection of the dimmer type, ii) the detection/evaluation of zero crossings and dimming angle; and iii) processing adequate (mains cycle-skipping) response to i) and ii).

With respect to task i), initially, when the bus capacitor is discharged, the power stage is operated in mode 1 (switch closed). Either immediately or after a while (due to dimmer action) current will start flowing (at t0), which can be detected with im is above a threshold. At t1=t0+n*Tper the power stage switches into mode 2. Tper is the estimated half cycle period of the supply voltage (e.g. 10 ms) and n is a number at least 1. Both input voltage vm and input current im are measured, which allows to detect dimmer type. The supply voltage when current starts and stops flowing, as well as the sign and amplitude of respective di/dt indicate the dimmer type. For instance, a current that smoothly stops at supply voltage zero crossing and rapidly starts at high supply voltage could mean that a leading edge dimmer is connected; a current that stops flowing at high supply voltage and smoothly starts at low or zero supply voltage could indicate a trailing edge dimmer; etc.

Task ii) refers to the detection/evaluation of zero crossings and dimming angle. From start up also a supply voltage crossing can be either detected or computed for supply synchronization, which is refreshed in the following (mode 1) cycles:

In case of triac (leading edge) dimmers, the supply voltage can be sensed even in mode 2 via a small (e.g. 1 nF) capacitor via the power input terminals 51, 52. Mode 1 always ends with a voltage zero crossing (which in mode 1 can always be detected). In case of trailing edge (transistor) dimmers the supply voltage crossings can hardly be detected in mode 2 but have to be estimated based on the measurements of period time. Data can be adjusted in mode 1 by means of evaluating voltage measurements. For instance, if no crossings are detected after turn on means that the crossing passed and the period estimated is too long, etc. In either case, and based on the derived knowledge of the dimmer type, a phase cut angle/dimming factor a can be processed, i.e. the fraction of a period between (estimated/measured) voltage zero crossing and abrupt current change.

Task iii) refers to the processing of an adequate (supply cycle-skipping) response to tasks 1 and 2. Based on the dimmer type assessment, the number of consecutive cycles the power stage runs in mode 1 may be varied. Some two-wire transistor dimmers do a supply voltage crossing detection/estimation themselves and require e.g. to detect negative/or positive crossings only for proper operation. To cope with this case, the power stage therefore preferably turns to mode 1 always shortly before a zero crossing (e.g. 1 ms). The power stage may also stay in mode 1 for more than a single half cycle if no current flow is detected and wait (remain in mode1) until the end of a half cycle in which a current flow is detected.

The present invention is preferably applied in consumer and "prosumer" (professional consumer) drivers, in particular as LED drivers, above 2 W, e.g. either integrated into a luminaire or external for HV LEDs. Further applications are non-mains isolated professional drivers with relaxed THD requirement (e.g. 20%) and HV LED string loads. Still further, preferred applications are in retrofit LED lamps in the power range of about 2 to 20 W which have to comply with any kind of wall plug dimmers.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A method, comprising:
receiving at an input of a driver a periodic supply voltage from an external power supply,
providing at an output of the driver at least one of a drive voltage and a drive current for driving a load,
alternately operating the driver in one of a first mode and a second mode, including:
  in the first mode, controlling an input current received by the driver from the external power supply to draw a first power level from the external power supply, the first power level being greater than a power level required for driving the load, and supplying from the input current the at least one of the drive voltage and the drive current to the load, and further supplying electrical energy to charge an energy storage device; and
  in the second mode, controlling the input current received from the power input terminals to draw no more than a second power level from the external power supply, wherein the second power level is less than the power required for driving the load, and providing the at least one of the drive voltage and the drive current to the load from the energy storage device,
wherein alternately operating the driver in one of the first mode and the second mode includes operating only in the first mode for a first set of half cycles of the periodic supply voltage, and operating only in the second mode for a second set of half cycles of the periodic supply voltage immediately subsequent to the first set of half cycles of the periodic supply voltage.

2. The method of claim 1, wherein alternately operating the driver in one of the first mode and the second mode includes periodically alternating between the first mode and the second mode.

3. The method of claim 1, wherein a number of half cycles of the periodic supply voltage in the first set is one, and number of half cycles of the periodic supply voltage in the second set is greater than one.

4. The method of claim 1, wherein a ratio of a total number (N) of half cycles of the periodic supply voltage in the first set and in the second set, to a number of half cycles of the periodic supply voltage in the first set, is equal to a ratio of the first power level to the power level required for driving the load.

5. An apparatus, comprising:
a pair of input terminals configured to be connected to an external power supply and to receive therefrom a periodic supply voltage; and
a driver coupled to the pair of input terminals, the driver being configured to supply at least one of a drive voltage and a drive current for driving a load, wherein the driver comprises:
  an energy storage device, and
  a power stage configured to alternately operate in one of a first mode and a second mode, including:
    in the first mode, the power stage controlling an input current received by the driver from the external power supply to draw a first power level from the external power supply, the first power level being greater than a power level required for driving the load, and the power stage supplying from the input current the at least one of the drive voltage and the drive current to the load, and further supplying electrical energy to charge the energy storage device; and in the second mode, the power stage controlling the input current received from the power input terminals to draw no more than a second power level from the external power supply, wherein the second power level is less than the power required for driving the load, wherein the energy storage device is configured to provide the at least one of the drive voltage and the drive current to the load when the power stage operates in the second mode, and wherein alternately operating the driver in one of the first mode and the second mode includes operating only in the first mode for a first set of half cycles of the periodic supply voltage, and operating only in the second mode for a second set of half cycles of the periodic supply voltage immediately subsequent to the first set of half cycles of the periodic supply voltage.

6. The apparatus of claim 5, wherein the power stage includes a switching device configured to be controlled to cause the power stage to switch between the first mode and the second mode.

7. The apparatus of claim 5, further comprising the load, wherein the load comprises a light assembly comprising one or more light units, including a light emitting diode (LED) light unit comprising one or more LEDs.

* * * * *